(12) United States Patent
Keeriyadath et al.

(10) Patent No.: US 10,083,091 B1
(45) Date of Patent: *Sep. 25, 2018

(54) MEMORY RESIDENT STORAGE RECOVERY DURING COMPUTER SYSTEM FAILURE

(71) Applicant: International Business Machines Corporation, Armonk, NY (US)

(72) Inventors: Sangeeth Keeriyadath, Kozhikode (IN); Nitin Kumar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/465,656

(22) Filed: Mar. 22, 2017

(51) Int. Cl.
```
G06F 11/00      (2006.01)
G06F 11/14      (2006.01)
G06F 3/06       (2006.01)
G06F 9/455      (2018.01)
```

(52) U.S. Cl.
CPC .......... *G06F 11/1451* (2013.01); *G06F 3/065* (2013.01); *G06F 3/0619* (2013.01); *G06F 3/0685* (2013.01); *G06F 9/45558* (2013.01); *G06F 11/1464* (2013.01); *G06F 2009/45583* (2013.01); *G06F 2009/45591* (2013.01); *G06F 2201/815* (2013.01)

(58) Field of Classification Search
CPC ............... G06F 11/1451; G06F 3/0619; G06F 9/45558; G06F 2009/45583; G06F 2201/815

See application file for complete search history.

(56) References Cited

U.S. PATENT DOCUMENTS

| | | | |
|---|---|---|---|
| 4,323,987 A | | 4/1982 | Holtz et al. |
| 4,959,774 A | | 9/1990 | Davis |
| 5,734,814 A | * | 3/1998 | Corbin ............... G06F 11/1076 711/114 |
| 5,893,140 A | * | 4/1999 | Vahalia ............... G06F 11/1435 706/908 |

(Continued)

OTHER PUBLICATIONS

Keeriyadath et al., "Memory Resident Storage Recovery During Computer System Failure", U.S. Appl. No. 15/685,253, filed Aug. 24, 2017, 34 pages.

(Continued)

*Primary Examiner* — Philip A Guyton
(74) *Attorney, Agent, or Firm* — Monchai Chuaychoo

(57) ABSTRACT

An approach for virtual machine (VM) random access memory (RAM) disk preservation during VM failure. A RAM disk manager receives a VM identifier and attributes for connecting a RAM disk to the VM, where the RAM disk includes a memory region separate from memory region(s) associated with the VM. The RAM disk manager creates a RAM disk VM driver for interfacing the RAM disk between a disk driver and virtual drive adapter. The RAM disk manager detects an output action based on the disk driver operation and responds to detecting an output action by storing output data to the RAM disk and marking synchronization status as pending. The RAM disk manager synchronizes the output data, asynchronously with non-volatile storage and detects a failed VM, responding by disconnecting the RAM disk and can re-assign the RAM disk to a next VM.

20 Claims, 4 Drawing Sheets

(56) References Cited

U.S. PATENT DOCUMENTS

| | | | |
|---|---|---|---|
| 6,584,580 B1 | 6/2003 | Yamamoto et al. | |
| 9,032,248 B1* | 5/2015 | Petty | G06F 11/2038 |
| | | | 714/11 |
| 9,317,320 B2* | 4/2016 | Lee | G06F 9/45558 |
| 9,766,824 B2* | 9/2017 | Matsuzawa | G06F 3/0619 |
| 2013/0117744 A1* | 5/2013 | Klein | G06F 9/45533 |
| | | | 718/1 |
| 2013/0145085 A1 | 6/2013 | Yu et al. | |
| 2014/0165056 A1* | 6/2014 | Ghai | G06F 12/0891 |
| | | | 718/1 |
| 2014/0215277 A1 | 7/2014 | Judd | |
| 2015/0095597 A1* | 4/2015 | Ayanam | G06F 3/065 |
| | | | 711/162 |
| 2016/0055018 A1 | 2/2016 | Usgaankar et al. | |
| 2016/0110127 A1* | 4/2016 | Qiao | G06F 3/0619 |
| | | | 711/162 |
| 2016/0154597 A1 | 6/2016 | McKelvie et al. | |
| 2016/0179635 A1* | 6/2016 | Kondalsamy | G06F 11/203 |
| | | | 714/4.12 |
| 2016/0283336 A1 | 9/2016 | Petersen | |

OTHER PUBLICATIONS

IBM Appendix P, list of patents or patent applications treated as related, 2017, 2 pages.

\* cited by examiner

MEMORY RESIDENT STORAGE RECOVERY DURING COMPUTER SYSTEM FAILURE

BACKGROUND OF THE INVENTION

The present invention relates generally to the field of virtual machine (VM) management, and more specifically to providing a hypervisor in a virtualized environment to preserve and restore RAM disk data during a computer system failure.

Dynamic Random Access Memory (DRAM) is recognized by one skilled in the art as a fast/effective method of caching data blocks as compared to other memory technologies and DRAM can be used as a caching layer for read/write operations and the DRAM caching layer can be known in the art as a RAM disk (e.g., a data storage disk created from DRAM space). DRAM is a non-persistent/volatile memory and the non-persistence can contribute to a loss of data in a RAM disk data in the event of a virtual machine freeze, crash or other failure. During a VM failure, loss of a RAM disk and the related data loss can weaken the speed benefits gained by using RAM disk caching for disk read/write operations in a VM environment.

SUMMARY

As disclosed herein, a computer-implemented method for virtual machine (VM) random access memory (RAM) disk preservation during VM failure, the computer-implemented method comprising: receiving, by a RAM disk manager, a VM identifier and VM attributes for connecting a RAM disk to the VM, wherein the RAM disk comprises a memory region separate from memory region(s) associated with the VM; creating, by the RAM disk manager, a RAM disk VM driver for interfacing the RAM disk between a disk driver and virtual drive adapter; detecting, by the RAM disk manager, an output action based on the disk driver operation; responsive to detecting an output action, storing, by the RAM disk manager, output data to the RAM disk and marking synchronization status associated with the output data as pending and synchronizing, by the RAM disk manager, the output data based on the synchronization status of pending, asynchronously with non-volatile storage associated with the VM and marking the synchronization status of the output data as complete. A computer system and a computer program product corresponding to the above method are also disclosed herein.

BRIEF DESCRIPTION OF THE DRAWINGS

The present invention is described in the detailed description, which follows, references the noted plurality of drawings by way of non-limiting examples of exemplary embodiments of the present invention.

DETAILED DESCRIPTION

Figure 1:
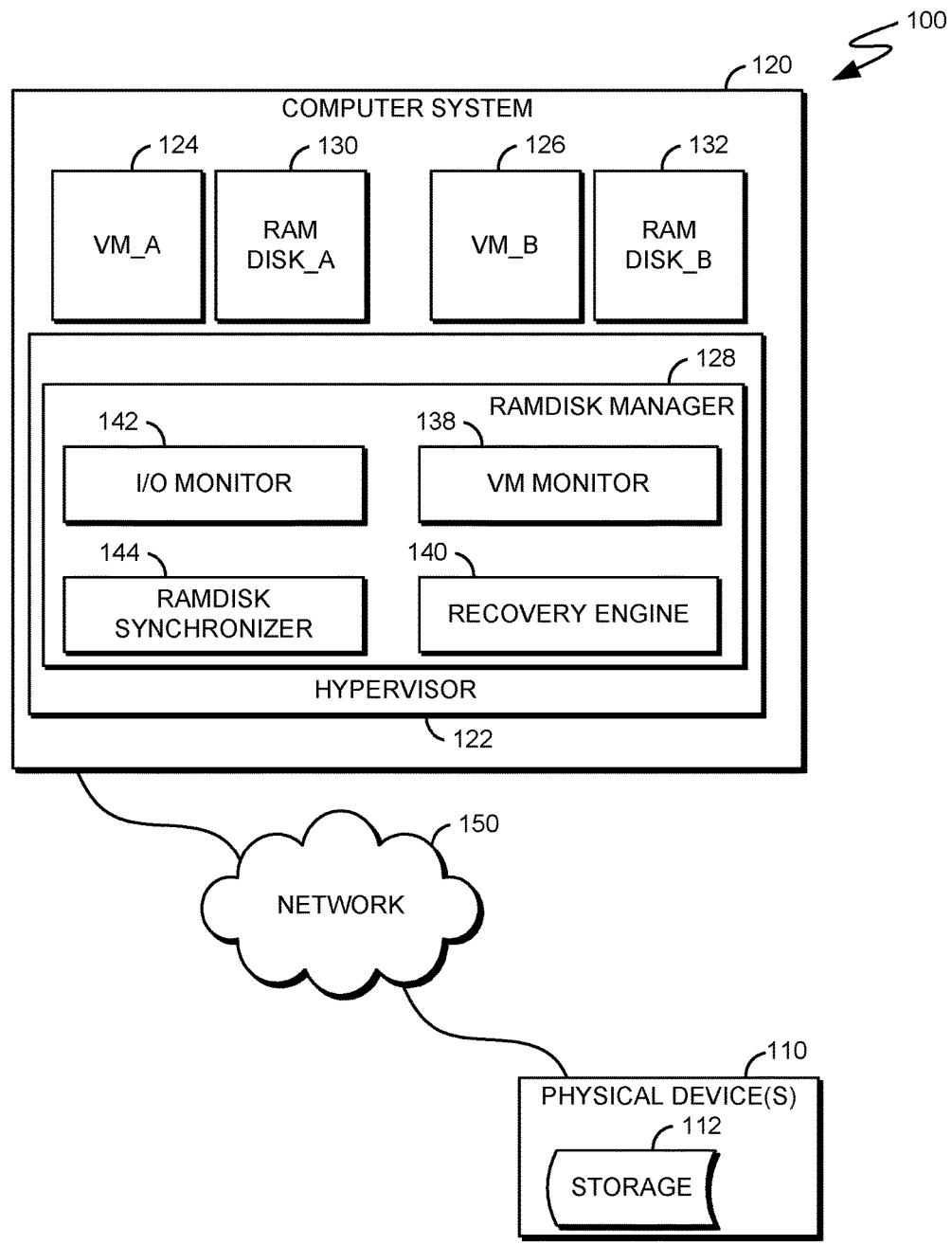
FIG. 1 illustrates a functional block diagram of a computing environment, in accordance with an embodiment of the present invention.

Aspects of the present disclosure and certain features, advantages and details thereof, are explained more fully below with reference to the non-limiting examples illustrated in the accompanying figures. Descriptions of well-known materials, fabrication tools, processing techniques, etc., are omitted to avoid obscuring the disclosure with unnecessary detail. It should be understood, however, that the detailed description and the specific examples, while indicating aspects of the invention, are given by way of illustration only and not by way of limitation. Various substitutions, modifications, additions and/or arrangements, within the spirit and/or scope of the underlying inventive concepts will be apparent to those skilled in the art from this disclosure. It should be understood in advance that although this disclosure includes a detailed description on a single computer system, implementation of the teachings recited herein are not limited to a computer system and environment. Rather, embodiments of the present invention are capable of being implemented in conjunction with any other type of virtualized computing environment now known or later developed such as systems that include multiple computers or clusters of systems on which a virtualized machine environment can be implemented.

Embodiments of the present invention provide systems, methods, and computer program products to improve virtual machine (VM) data storage speed by interfacing random access memory (RAM) disk technology with persistent/non-volatile storage while enabling a mechanism to protect and preserve data from a VM assigned RAM disk (e.g., memory resident storage) in the event of a VM failure (e.g., freeze, crash, abnormal loss of VM operation) within a computer system. Embodiments of the present invention describe a hypervisor and/or hypervisor module to enable dynamic RAM (DRAM) and/or RAM to act as a cache layer (e.g., RAM disk) for read and/or write operations. Embodiments of the present invention comprise a "RAM disk manager hypervisor/module" which has visibility to a region of memory used by a VM for caching. It should be noted that the RAM disk caching memory, formerly described, can be separate from the memory region used by a VM's operating system and thereby protects a RAM disk from related VM failures. The RAM disk manager hypervisor can operate a "RAM disk VM driver module", established for use by an assigned VM, to enable write caching in the VM by creating an interface between the VM disk driver and a VM disk drive adapter driver where the VM disk drive adapter driver can be used to interface physical data storage (e.g., persistent/non-volatile storage) associated with the VM. The "RAM disk VM driver module" can be resident in a VM and interface between a disk driver and adapter driver of the VM. The "RAM disk VM driver module" and cache buffer (e.g., RAM disk) can act as an intermediate layer to store VM input/output (I/O) data until the data are actually synchronized, asynchronously, toward non-volatile storage. It should be noted that RAM disk operation can be transparent to processing layers such as, but not limited to, VM applications and disk driver(s). It should be further noted that RAM disk pending write data can be synchronized asynchronously with physical data storage. Some embodiments can detect if a VM has failed and if a VM failure is detected, the RAM disk manager hypervisor can disconnect the RAM disk from the failed VM, complete synchronization of write operations toward non-volatile storage and can further connect the RAM disk to a new VM or back-up VM to prevent data loss from the RAM disk and to enable continued VM operation.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

FIG. 1 illustrates a functional block diagram of computing environment 100, in accordance with an embodiment of the present invention. Computing environment 100 comprises PHYSICAL DEVICE(S) 110 and COMPUTER SYSTEM 120, interconnected via NETWORK 150. PHYSICAL DEVICE(S) 110 and COMPUTER SYSTEM 120 can be desktop computers, laptop computers, specialized computer servers, or the like. In certain embodiments, PHYSICAL DEVICE(S) 110 and COMPUTER SYSTEM 120 collectively represent computer systems utilizing clustered computers and components acting as a single pool of seamless resources via NETWORK 150. For example, such embodiments can be used in data center, cloud computing, storage area network (SAN), and network attached storage (NAS) applications. In general, PHYSICAL DEVICE(S) 110 and COMPUTER SYSTEM 120 are representative of any electronic devices, or combination of electronic devices, capable of executing computer readable program instructions, as described in detail with regard to FIG. 4.

In some embodiments, PHYSICAL DEVICE(S) 110 can be a plurality of PHYSICAL DEVICE(S) 110 and PHYSICAL DEVICE(S) 110 can be a separate and/or integrated tool that can store data in a non-volatile manner (e.g., disk drive). In the depicted embodiment, PHYSICAL DEVICE(S) 110 comprises STORAGE 112 where STORAGE 112 can comprise any combination of commercial or custom devices and/or software products associated with accessing and storing data in a non-volatile method (e.g., storage coherence is persistent after power is removed).

In some embodiments, NETWORK 150 comprises, for example, a local area network (LAN), a wide area network (WAN) such as the Internet, or a combination of the two, and include wired, wireless, or fiber optic connections. In general, NETWORK 150 can be any combination of connections and protocols that can support communications between PHYSICAL DEVICE(S) 110 and COMPUTER SYSTEM 120, in accordance with some embodiments.

In some embodiments, COMPUTER SYSTEM 120 comprises HYPERVISOR 122, VM_A 124, RAMDISK_A 130, VM_B 126 and RAMDISK_B 132. COMPUTER SYSTEM 120 can also comprise a shared host hardware layer and/or a virtual machine monitor (VMM) which can be identified as a hypervisor layer (e.g., HYPERVISOR 122). HYPERVISOR 122 further comprises RAMDISK MANAGER 128 and other functions such as, but not limited to, a VMM (not depicted).

In some embodiments, HYPERVISOR 122 can be a plurality of HYPERVISORS 122 within COMPUTER SYSTEM 120. HYPERVISOR 122 can be a hypervisor layer representing a virtualization layer, operating on shared host hardware than can create virtual machines and control the operation and execution of the virtual machine processes and operations (e.g., VM_A 124, VM_B 126). HYPERVISOR 122 can operate in conjunction with a combination of commercial or custom devices and/or software products and can be a separate and/or integrated tool for managing Virtualized Machines. HYPERVISOR 122 can be implemented to support the emulation of a physical device to enable a VM (e.g., VM_A 124, VM_B 126) to communicate with a resource (e.g., PHYSICAL DEVICE(S) 110). It should be noted that a plurality of hypervisors can be operated within COMPUTER SYSTEM 120 where the plurality of HYPERVISOR 122 can manage a variety of computing functions, independent and/or in cooperation with RAMDISK MANAGER 128.

In some embodiments, VM_A 124 and VM_B 126 represent Virtual Machines within COMPUTER SYSTEM 120. It should be noted VM_A 124 and VM_B 126 as depicted, are illustrative of a plurality of Virtual Machines that can operate within COMPUTER SYSTEM 120. A virtual machine, known by one skilled in the art, can be described as an emulation of a computing environment that can be created, run and/or monitored by a hypervisor software layer operating within a shared host computer system. In some embodiments, VM_A 124 and/or VM_B 126 can comprise any combination of commercial or custom devices and/or software products operational with virtualized computing environments.

In some embodiments, RAMDISK MANAGER 128 can be a plurality of RAMDISK MANAGERS 128 within HYPERVISOR 122. RAMDISK MANAGER 128 can be characterized as module within a hypervisor layer with operability across a shared operating system and virtual machines (e.g., VM_A 124, VM_B 126) operated by HYPERVISOR 122. RAMDISK MANAGER 128 can operate in conjunction with a combination of commercial or custom devices and/or software products and can be a separate and/or integrated tool that can be operated to create and/or manage RAM disk(s) (e.g., RAMDISK_A 130, RAMDISK_B 132) used in coordination with non-volatile storage. Further, RAMDISK MANAGER 128 can monitor, preserve and/or recover the RAM disk/cached data that is available during VM operation and/or VM failure (e.g., freeze, crash, abnormal loss of VM operation). In the depicted embodiment, RAMDISK MANAGER 128 comprises, VM MONITOR 138, RECOVERY ENGINE 140, I/O MONITOR 142 and RAMDISK SYNCHRONIZER 144. It should be noted that in some embodiments RAMDISK MANAGER 128 can create and/or operate with VM resident helper module(s) (e.g., a RAM disk VM driver) to perform at least a portion of the function described hereinafter by VM MONITOR 138, RECOVERY ENGINE 140, I/O MONITOR 142 and RAMDISK SYNCHRONIZER 144.

In some embodiments, RAMDISK_A 130 and RAMDISK_B 132 can be a plurality of RAMDISK_A 130 and RAMDISK_B 132 within COMPUTER SYSTEM 120. RAMDISK_A 130 and RAMDISK_B 132 represent VM RAM disks that are assigned/connected to their respective VM (e.g., VM_A 124, VM_B 126). A RAM disk (e.g., RAMDISK_A 130 and RAMDISK_B 132) can be established for used by a respective VM to enable read/write data caching which can improve data storage processing speed while interfacing physical/non-volatile data storage asynchronously. RAMDISK_A 130 and RAMDISK_B 132 can be operated in cooperation with respective VM_A 124, VM_B 126 while operating in memory region(s) separate from VM_A 124, VM_B 126. Further, RAMDISK MANAGER 128 can operate creation, connection and management of RAM disks (e.g., RAMDISK_A 130, RAMDISK_B 132). It should be noted that a RAM disk can comprise information such as, but not limited to a metadata section and a data section. The metadata section can be described as comprising unique identifiers of the disk(s) being cached by each VM. The metadata can provide the RAM disk manager hypervisor (e.g., RAMDISK MANAGER 128) and/or other VMs (e.g., VM_A 124, VM_B 126) in the same system with information to identify the target disks/non-volatile storage being cached (e.g., RAMDISK_A 130, RAMDISK_B 132) and which data block(s) in the RAM disk is/are pending to be synchronized toward non-volatile storage. The data section can be described as comprising data block(s) to be written to non-volatile storage. Further, the data section can comprise unique identifiers to represent the non-volatile storage destination for the data to be written. It should be noted that cached data in the RAM disk can be considered "self-sufficient" and separately allocated from RAMDISK MANAGER 128 and/or a connected VM so that RAMDISK MANAGER 128 can complete pending write operations of data to be synchronized in non-volatile storage. In each VM managed by RAMDISK MANAGER 128, a region of memory used for caching (e.g., RAMDISK_A 130) can be independently addressable by an operating system kernel resident driver and a VM counterpart. The RAM disk memory can be allocated from the system memory for the related VM and RAMDISK MANAGER 128 can mark and save the information associated with the RAM disk and/or the VM for which the RAM disk is connected. It should be noted that it is possible that the base/host operating system (OS) can use a memory scheme where Virtual Memory is equal to Real Memory (V=R) or alternatively described, where a memory address recognized by the OS in a VM (guest OS) can be the same memory address as recognized by a hypervisor and/or the host OS.

In some embodiments, VM MONITOR 138 can be a plurality of VM MONITORS 138 within RAMDISK MANAGER 128. VM MONITOR 138 can monitor one or more VM(s) (e.g., VM_A 124, VM_B 126) for failures such as, but not limited to, freeze, crash, abnormal loss of VM operation. When a VM failure is detected, VM MONITOR 138 can transfer operation toward RECOVERY ENGINE 140.

In some embodiments, RECOVERY ENGINE 140 can be a plurality of RECOVERY ENGINES 140 within RAMDISK MANAGER 128. RECOVERY ENGINE 140 can perform functions such as, but not limited to, disconnect a RAM disk associated with a failed VM, create a replacing VM, assign the RAM disk formerly connected with the failed VM to the replacing VM or a pre-existing "backup" VM and pass control to RAMDISK SYNCHRONIZER 144 to complete writing of pending data in the RAM disk associated with the failed VM. It should be noted that the replacing VM can be termed as a "next VM" irrespective of the replacing VM being newly created after a VM failure or the replacing VM is the pre-existing "backup" VM. In some embodiments, I/O MONITOR 142 can be a plurality of I/O MONITORS 142 within RAMDISK MANAGER 128. I/O MONITOR 142 can monitor a VM (e.g., VM_A 124, VM_B 126) for input/output (I/O) activities. When a VM I/O operation is detected, I/O MONITOR 142 can activate RAMDISK SYNCHRONIZER 144 to store data in the respectively connected RAM disk (e.g., RAMDISK_A 130, RAMDISK_B 132) and synchronize RAM disk data with associated non-volatile storage (e.g., STORAGE 112) associated with a respective VM (e.g., VM_A 124, VM_B 126).

In some embodiments, RAMDISK SYNCHRONIZER 144 can be a plurality of RAMDISK SYNCHRONIZERS 144 within RAMDISK MANAGER 128. RAMDISK SYNCHRONIZER 144 can store data (e.g., via VM helper module RAM disk VM driver) toward a connected RAM disk during VM I/O operations and can determine RAM disk data that are pending to be written toward non-volatile storage (e.g., STORAGE 112) associated with a respective VM (e.g., VM_A 124, VM_B 126). It should be noted that RAMDISK SYNCHRONIZER 144 can operate RAM disk synchronization with non-volatile storage in an asynchronous mode. Further RAMDISK SYNCHRONIZER 144 can track pending and/or completed synchronization operations by methods such as, but not limited to, marking a synchronization status indicator (e.g., pending, complete) in the RAM disk metadata, data or by other identifying techniques. It should be noted that RAMDISK SYNCHRONIZER 144 can operate asynchronously, operating in modes such as, but not limited to, real-time based, event based and batch based.

Figure 2A:
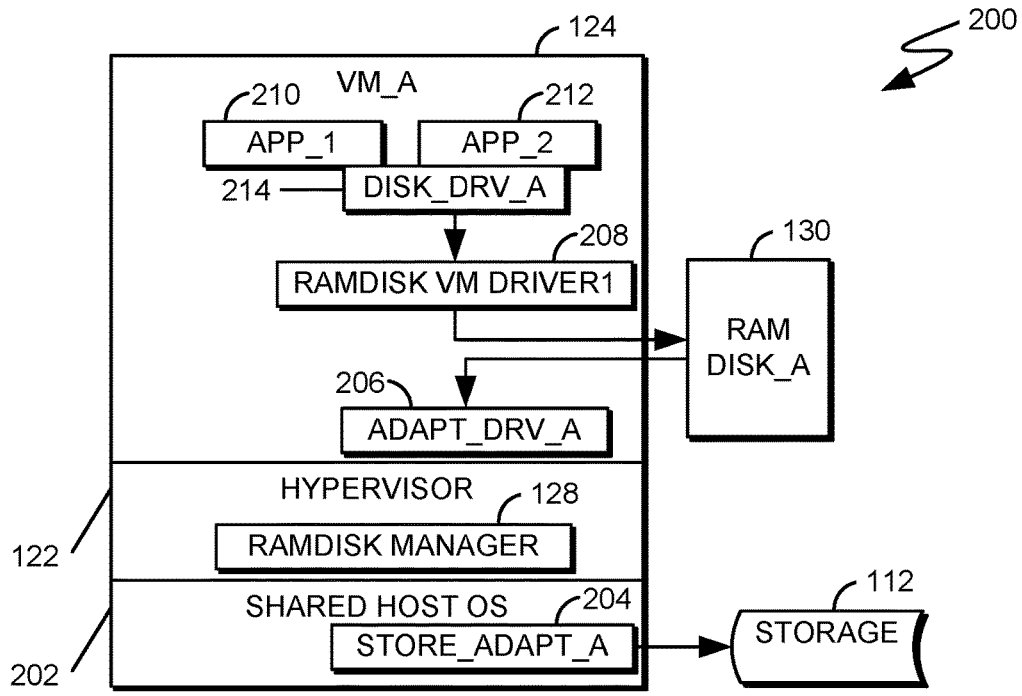
FIG. 2A illustrates a sample architecture of RAMDISK MANAGER prior to VM failure, in accordance with an embodiment of the present invention.

FIG. 2A illustrates a sample architecture of RAMDISK MANAGER prior to VM failure, in accordance with an embodiment of the present invention. RAMDISK MANAGER architecture 200 comprises items STORAGE 112, HYPERVISOR 122, VM_A 124, RAMDISK MANAGER 128, RAMDISK_A 130, as described in FIG. 1, and items SHARED HOST OS 202, STORE_ADAPT_A 204, ADAPT_DRV_A 206, RAMDISK VM DRIVER1 208, APP_1 210, APP_2 212, DISK_DRV_A 214.

Item SHARED HOST OS 202 illustrates a shared operating system that operates on COMPUTER SYSTEM 120 and can host/operate a VM computing system architecture and can provide "real" and/or "non-virtual" operability with physical storage device(s) (e.g., item STORE_ADAPT_A 204). As illustrated, a hypervisor layer (e.g., HYPERVISOR 122) can operate item STORE_ADAPT_A 204 by HYPERVISOR 122 operational connection with item SHARED HOST OS 202, which illustrates a drive/storage adapter (e.g., virtual and/or physical) that can be associated with a physical storage device (e.g., STORAGE 112) and allocated toward a related VM (e.g., VM_A 124).

Item ADAPT_DRV_A 206 illustrates an emulated/virtual drive adapter associated with VM_A 124 and can interface with item STORE_ADAPT_A 204 to operate physical storage device(s) (e.g., STORAGE 112).

Item RAMDISK VM DRIVER1 208 illustrates an interfacing RAM disk driver operated by RAMDISK MANAGER 128 to manage RAMDISK_A 130. It should be noted that the RAM disk driver (e.g., RAMDISK VM DRIVER1 208) can cache I/O data that is directed toward non-volatile storage and can identify attributes such as, but not limited to, unique ID that can be stored as metadata in the RAM disk assigned a VM. It should be noted that the RAM disk driver can perform memory to memory copy of data to/from working memory of a VM and can update metadata of the RAM disk to indicate completion of I/O operations.

Item DISK_DRV_A 214 illustrates disk/storage driver which can be "visible" to applications within VM_A 122. Further, items APP_1 210 and APP_2 212 illustrate a plurality of user applications that can be operated in VM_A 124 and can generate I/O that can be directed toward STORAGE 112 via item DISK_DRV_A 214. It should be noted that applications can operate, unmodified, with item DISK_DRV_A 214 and do not require any special features to recognize RAMDISK MANAGER 128 operation.

Figure 2B:
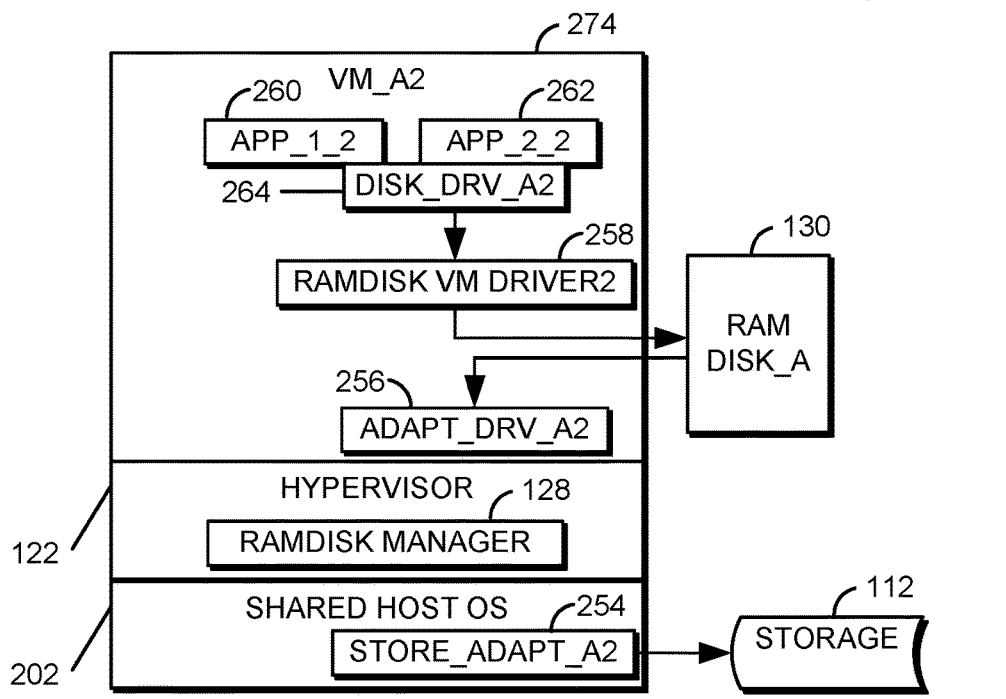
FIG. 2B illustrates a sample architecture of RAMDISK MANAGER after recovery from VM failure, in accordance with an embodiment of the present invention.

FIG. 2B illustrates a sample architecture of RAMDISK MANAGER after recovery from VM failure, in accordance with an embodiment of the present invention. RAMDISK MANAGER recovered architecture 250 represents a recovery of RAMDISK_A 130 as depicted in FIG. 2A and comprises items STORAGE 112, HYPERVISOR 122, RAMDISK MANAGER 128, RAMDISK_A 130, as described in FIG. 1, item SHARED HOST OS 202, as described in FIG. 2A and items STORE_ADAPT_A2 254, ADAPT_DRV_A2 256, RAMDISK VM DRIVER2 258, APP_1_2 260, APP_2_2 262, DISK_DRV_A2 264, VM_A2 274. RAMDISK MANAGER recovered architecture 250 represents RAMDISK MANAGER architecture 200 after RAMDISK MANAGER 128 detected (e.g., VM MONITOR 138) that VM_A 124 failed. RAMDISK MANAGER 128 responded to VM_A 124 failure by disconnecting RAMDISK_A 130 toward VM_A 124. It should be noted that items STORE_ADAPT_A2 254, ADAPT_DRV_A2 256, RAMDISK VM DRIVER2 258, APP_1_2 260, APP_2_2 262, DISK_DRV_A2 264 and VM_A2 274 represent functionally equivalent replacements of respective items STORE_ADAPT_A 204, ADAPT_DRV_A 206, RAMDISK VM DRIVER1 208, APP_1 210, APP_2 212, DISK_DRV_A 214 and VM_A 124.

Item VM_A2 274 illustrates a next VM, managed by HYPERVISOR 122, to replace failed item VM_A 124. It should be noted that item VM_A2 274 can be a pre-existing back up VM or a newly created VM that HYPERVISOR 122 operates/activates based on failure of item VM_A 124. Item RAMDISK VM DRIVER2 258 depicts a replacement of item RAMDISK VM DRIVER1 208 (e.g., re-established via RAMDISK MANAGER 128). Similarly, item ADAPT_DRV_A2 256 depicts a replacement of item ADAPT_DRV_A 206. RAMDISK MANAGER 128 connects RAMDISK_A 130, formerly connected toward VM_A 124, now connected toward replacement item VM_A2 274. Further, RAMDISK MANAGER 128 establishes connection of RAMDISK_A 130 toward item RAMDISK VM DRIVER2 258 and establishes associating links of item ADAPT_DRV_A2 256 and item DISK_DRV_A2 264. It should be noted that item APP_1_2 260 and item APP_2_2 262 represent similar respective applications (e.g., item APP_1 210, item APP_2 212) formerly operating in failed VM_A 124.

Item STORE_ADAPT_A2 254 illustrates a drive adapter, similar to item STORE_ADAPT_A 204, that could have been assigned from a virtual pool of adapters linking STORAGE 112. It should be noted that RAMDISK MANAGER 128 can complete RAMDISK_A 130 pending write operations toward STORAGE 112 prior to connecting RAMDISK_A 130 toward VM_A2 274 or after connecting RAMDISK_A 130 toward VM_A2 274 and prior to enabling full operation of item VM_A2 274.

Figure 3:
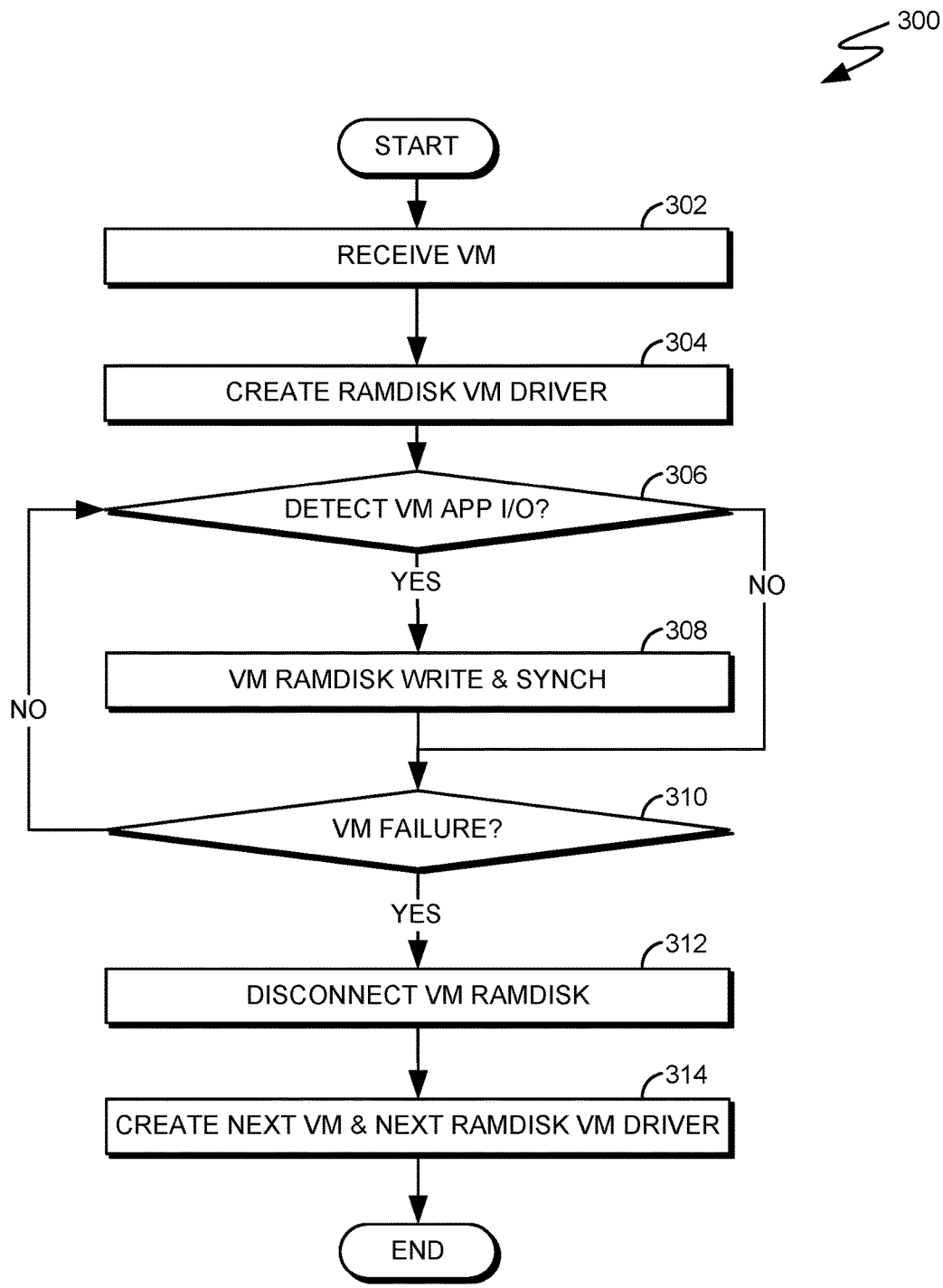
FIG. 3 illustrates a flowchart of RAMDISK MANAGER operation, in accordance with an embodiment of the present invention.

FIG. 3 illustrates a flowchart of RAMDISK MANAGER operation, in accordance with an embodiment of the present invention. RAMDISK MANAGER operation 300, comprises operations RECEIVE VM 302, CREATE RAMDISK VM DRIVER 304, DETECT VM APP I/O 306, VM RAMDISK WRITE & SYNCH 308, VM FAILURE 310, DISCONNECT VM RAMDISK 312 and CREATE NEXT VM & NEXT RAMDISK VM DRIVER 314.

Operation RECEIVE VM 302, can receive VM identifiers and VM attributes for a VM (e.g., VM_A 124) to be managed by a RAM disk manager (e.g., RAMDISK MANAGER 128). When operation RECEIVE VM 302 completes, processing proceeds toward operation CREATE RAMDISK VM DRIVER 304.

Operation CREATE RAMDISK VM DRIVER 304, can create a RAM disk driver (e.g., item RAMDISK VM DRIVER1 208) in the VM to interface a VM disk driver (e.g., item DISK_DRV_A 214) used by application(s) (e.g., item APP_1 210, item APP_2 212) with a connected RAM disk (e.g., RAMDISK_A 130). In some embodiments, RAM disk manager can create a RAM disk to be connected by to the VM based on information such as, but not limited to, the VM identifiers, the VM attributes and one or more predetermined parameters. It should be noted that the hypervisor operating with RAMDISK MANAGER 128 can store information about the section/region of memory assigned to the VM/RAM disk used for RAM disk management. It should also be noted that operation CREATE RAMDISK VM DRIVER 304 can connect a new RAM disk (e.g., RAMDISK_A 130) or a pre-existing RAM disk for use with the VM. When operation CREATE RAMDISK VM DRIVER 304 completes, processing proceeds toward operation DETECT VM APP I/O 306.

Operation DETECT VM APP I/O 306, can monitor activities such as, but not limited to, VM application(s) (e.g., item APP_1 210, item APP_2 212) and VM disk driver (item DISK_DRV_A 214) for I/O activity. If an I/O event is detected (e.g., YES) then processing proceeds toward operation VM RAMDISK WRITE & SYNCH 308. Otherwise, operation DETECT VM APP I/O 306 processing proceeds toward operation VM FAILURE 310.

Operation VM RAMDISK WRITE & SYNCH 308, can write I/O data (e.g., RAMDISK SYNCHRONIZER 144), received toward the RAM disk VM driver (e.g., item RAMDISK VM DRIVER1 208), toward the RAM disk and the data can be synchronized/written toward non-volatile storage (e.g., STORAGE 112) identified as the destination of data block storage operation. When operation VM RAMDISK WRITE & SYNCH 308 completes, processing proceeds toward operation VM FAILURE 310.

Operation VM FAILURE 310, can monitor VM failure (e.g., crash, freeze), if VM failure occurs (e.g., YES) then, processing proceeds toward operation DISCONNECT VM RAMDISK 312. Otherwise, operation VM FAILURE 310 processing proceeds toward operation DETECT VM APP I/O 306.

Operation DISCONNECT VM RAMDISK 312, can disconnect the RAM disk memory assigned toward the failed VM via RECOVERY ENGINE 140 to prevent corruption of RAM disk memory/data and remaining pending write operations comprising the RAM disk (e.g., RAMDISK_A 130) can be completed toward STORAGE 112 via RECOVERY ENGINE 140. When operation DISCONNECT VM RAMDISK 312 completes, processing proceeds toward operation CREATE NEXT VM & NEXT RAMDISK VM DRIVER 314.

Operation CREATE NEXT VM & NEXT RAMDISK VM DRIVER 314, can create a new replacement VM (e.g., next VM) and/or respond to the creation of the next VM to create a next RAM disk driver (e.g., item RAMDISK VM DRIVER2 258), replacing a failed VM (e.g., VM_A 124). Processing can be similar to operation CREATE RAMDISK VM DRIVER 304 where the RAM disk connected toward the failed VM can be connected toward the next VM and interfaced with the RAM disk driver (e.g., item RAMDISK VM DRIVER2 258) and physical storage (e.g., STORAGE 112) via an adapter driver (e.g., item ADAPT_DRV_A2 256). It should be noted that in some embodiments, the next VM can be pre-defined as a "hot" backup and operation CREATE NEXT VM & NEXT RAMDISK VM DRIVER 314 can bypass creation of the next VM and execute a connection of the RAM disk toward the replacing predefined next VM. When operation CREATE NEXT VM & NEXT RAMDISK VM DRIVER 314 completes, processing proceeds toward END or can loop toward operation DETECT VM APP I/O 306 for continuous execution mode for a life-cycle of a VM.

Figure 4:
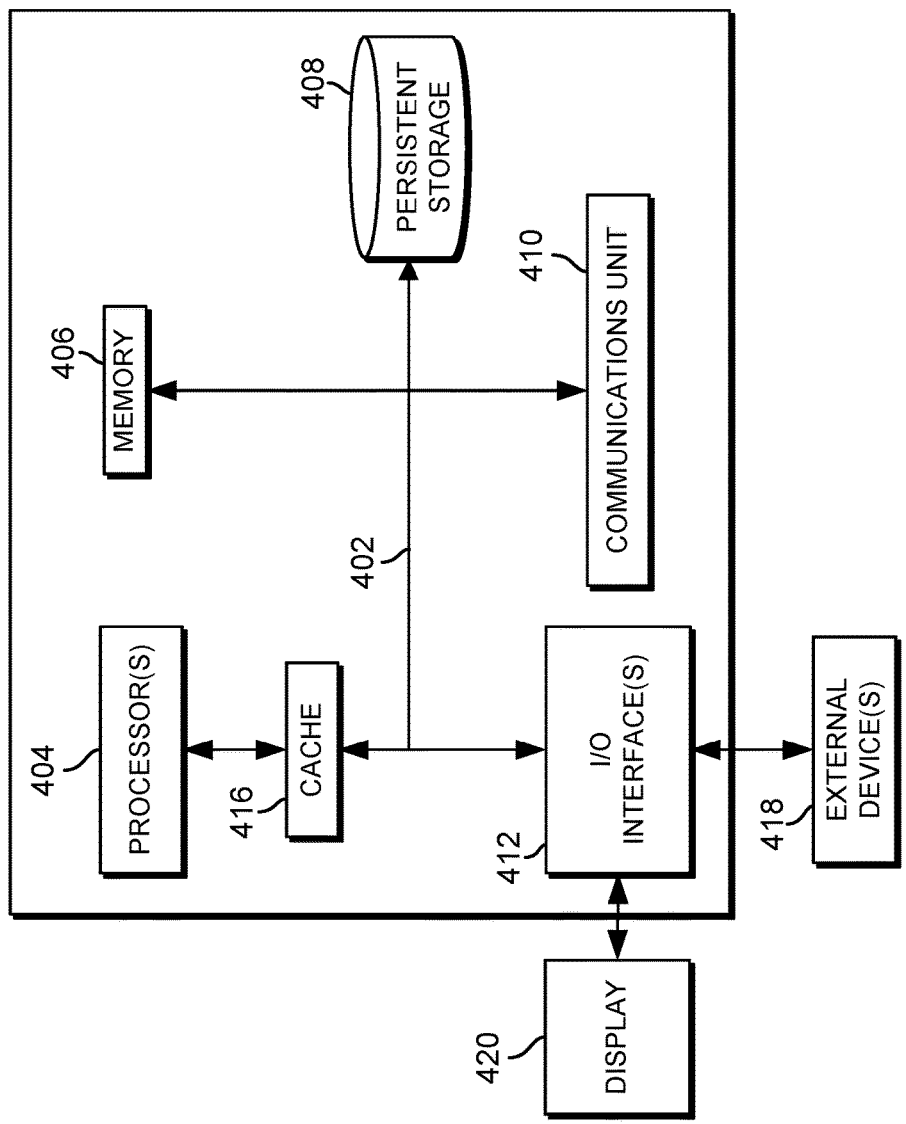
FIG. 4 illustrates a block diagram of components of the server and/or the computing device, in accordance with an embodiment of the present invention.

FIG. 4 illustrates a block diagram of components of PHYSICAL DEVICE(S) 110 and COMPUTER SYSTEM 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice some embodiments may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice some embodiments may be downloaded to persistent storage 408 through communications unit 410.

I/O interface(s) 412 allows for input and output of data with other devices that may be connected to each computer system. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice some embodiments can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The term "present invention" should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

The term "and/or" should be understood as inclusive or; for example, A, B "and/or" C means that at least one of A, B or C is true and applicable. Further, "at least one of A, B, or C" should be interpreted to mean only A, only B, only C, or any combination of A, B, and C.

What is claimed is:

1. A computer-implemented method for virtual machine (VM) random access memory (RAM) disk preservation during VM failure, the computer-implemented method comprising:
   receiving, by a RAM disk manager, a VM identifier and VM attributes for connecting a RAM disk to the VM, wherein the RAM disk comprises a memory region separate from memory region(s) associated with the VM;
   creating, by the RAM disk manager, a RAM disk VM driver for interfacing the RAM disk between a disk driver and virtual drive adapter, wherein the RAM disk VM driver caches output data and updates metadata, associated with the RAM disk, indicating completion of output operations from the VM;
   detecting, by the RAM disk manager, an output action based on the disk driver operation;
   responsive to detecting the output action, storing, by the RAM disk manager, the output data from the RAM disk VM driver cache to the RAM disk and marking synchronization status associated with the output data as pending; and
   synchronizing, by the RAM disk manager, the output data based on the synchronization status of pending, asynchronously with non-volatile storage associated with the VM and marking the synchronization status of the output data as complete.

2. The computer-implemented method of claim 1, further comprising:
   detecting, by the RAM disk manager, VM operating status of the VM is failed; and
   responsive to detecting the VM operating status is failed, disconnecting, by the RAM disk manager, the RAM disk from the VM for preventing data corruption of the RAM disk.

3. The computer-implemented method of claim 2, wherein disconnecting the RAM disk from the VM, further comprising:
   synchronizing, by the RAM disk manager, the RAM disk data based on the synchronization status of pending, with non-volatile storage associated with the VM and marking the synchronization status of the output data as complete.

4. The computer-implemented method of claim 2, wherein disconnecting the RAM disk from the VM, further comprising:
   connecting, by the RAM disk manager, the RAM disk to a next VM replacing the VM; and
   creating, by the RAM disk manager, a next RAM disk VM driver for interfacing the RAM disk between a next disk driver and next virtual drive adapter.

5. The computer-implemented method of claim 1, further comprising:
   creating, by the RAM disk manager, the RAM disk based, at least in part, on the VM identifier, the VM attributes and one or more predetermined parameters.

6. The computer-implemented method of claim 1, wherein the synchronization status comprises one or more metadata indicators of pending or complete to identify the output data storage synchronization status between the RAM disk and the non-volatile storage.

7. The computer-implemented method of claim 1, wherein timing associated with synchronizing the output data is operated in modes of at least one of real-time based, event based or batch based.

8. A computer-implemented computer program product for virtual machine (VM) random access memory (RAM) disk preservation during VM failure, the computer program product comprising:
   one or more non-transitory computer readable storage media and program instructions stored on the one or more non-transitory computer readable storage media, the program instructions comprising:
   program instructions to, receive, by a RAM disk manager, a VM identifier and VM attributes for connecting a RAM disk to the VM, wherein the RAM disk comprises a memory region separate from memory region(s) associated with the VM;
   program instructions to, create, by the RAM disk manager, a RAM disk VM driver for interfacing the RAM disk between a disk driver and virtual drive adapter wherein the RAM disk VM driver caches output data and updates metadata, associated with the RAM disk, indicating completion of output operations from the VM;
   program instructions to, detect, by the RAM disk manager, an output action based on the disk driver operation;
   program instructions to, respond to detecting the output action, storing, by the RAM disk manager, the output data from the RAM disk VM driver cache to the RAM disk and marking synchronization status associated with the output data as pending; and
   program instructions to, synchronize, by the RAM disk manager, the output data based on the synchronization status of pending, asynchronously with non-volatile storage associated with the VM and marking the synchronization status of the output data as complete.

9. The computer-implemented computer program product of claim 8, further comprising:
   program instructions to, detect, by the RAM disk manager, VM operating status of the VM is failed; and
   program instructions to, respond to detecting the VM operating status is failed, disconnecting, by the RAM disk manager, the RAM disk from the VM for preventing data corruption of the RAM disk.

10. The computer-implemented computer program product of claim 9, wherein disconnecting the RAM disk from the VM, further comprising:
    program instructions to, synchronize, by the RAM disk manager, the RAM disk data based on the synchronization status of pending, with non-volatile storage associated with the VM and marking the synchronization status of the output data as complete.

11. The computer-implemented computer program product of claim 9, wherein disconnecting the RAM disk from the VM, further comprising:
    program instructions to, connect, by the RAM disk manager, the RAM disk to a next VM replacing the VM; and
    program instructions to, create, by the RAM disk manager, a next RAM disk VM driver for interfacing the RAM disk between a next disk driver and next virtual drive adapter.

12. The computer-implemented computer program product of claim 8, further comprising:
  program instructions to, create, by the RAM disk manager, the RAM disk based, at least in part, on the VM identifier, the VM attributes and one or more predetermined parameters.

13. The computer-implemented computer program product of claim 8, wherein the synchronization status comprises one or more metadata indicators of pending or complete to identify the output data storage synchronization status between the RAM disk and the non-volatile storage.

14. The computer-implemented computer program product of claim 8, wherein timing associated with synchronize the output data is operated in modes of at least one of real-time based, event based or batch based.

15. A computer system for virtual machine (VM) random access memory (RAM) disk preservation during VM failure, the computer system comprising:
  one or more computer processors;
  one or more non-transitory computer readable storage media;
  program instructions stored on the one or more computer non-transitory readable storage media for execution by at least one of the one or more computer processors, the program instructions comprising:
    program instructions to, receive, by a RAM disk manager, a VM identifier and VM attributes for connecting a RAM disk to the VM, wherein the RAM disk comprises a memory region separate from memory region(s) associated with the VM;
  program instructions to, create, by the RAM disk manager, a RAM disk VM driver for interfacing the RAM disk between a disk driver and virtual drive adapter, wherein the RAM disk VM driver caches output data and updates metadata, associated with the RAM disk, indicating completion of output operations from the VM;
    program instructions to, detect, by the RAM disk manager, an output action based on the disk driver operation;
    program instructions to, respond to detecting the output action, storing, by the RAM disk manager, output data from the RAM disk VM driver cache to the RAM disk and marking synchronization status associated with the output data as pending; and
    program instructions to, synchronize, by the RAM disk manager, the output data based on the synchronization status of pending, asynchronously with non-volatile storage associated with the VM and marking the synchronization status of the output data as complete.

16. The computer system of claim 15, further comprising:
  program instructions to, detect, by the RAM disk manager, VM operating status of the VM is failed; and
  program instructions to, respond to detecting the VM operating status is failed, disconnecting, by the RAM disk manager, the RAM disk from the VM for preventing data corruption of the RAM disk.

17. The computer system of claim 16, wherein disconnecting the RAM disk from the VM, further comprising:
  program instructions to, synchronize, by the RAM disk manager, the RAM disk data based on the synchronization status of pending, with non-volatile storage associated with the VM and marking the synchronization status of the output data as complete.

18. The computer system of claim 16, wherein disconnecting the RAM disk from the VM, further comprising:
  program instructions to, connect, by the RAM disk manager, the RAM disk to a next VM replacing the VM; and
  program instructions to, create, by the RAM disk manager, a next RAM disk VM driver for interfacing the RAM disk between a next disk driver and next virtual drive adapter.

19. The computer system of claim 15, further comprising:
  program instructions to, create, by the RAM disk manager, the RAM disk based, at least in part, on the VM identifier, the VM attributes and one or more predetermined parameters.

20. The computer system of claim 15, wherein the synchronization status comprises one or more metadata indicators of pending or complete to identify the output data storage synchronization status between the RAM disk and the non-volatile storage.

\* \* \* \* \*